(12) United States Patent
Freeland et al.

(10) Patent No.: US 11,061,656 B1
(45) Date of Patent: Jul. 13, 2021

(54) SYSTEM AND METHOD FOR PROVIDING ANALYSIS OF DOWNLOAD COMPLETENESS FOR DOWNLOADABLE MEDIA

(71) Applicants: Robert W. Freeland, Lithia, FL (US); Mark McCrery, Alexandria, VA (US); Jason Defontes, Towson, MD (US)

(72) Inventors: Robert W. Freeland, Lithia, FL (US); Mark McCrery, Alexandria, VA (US); Jason Defontes, Towson, MD (US)

(73) Assignee: PODTRAC, Inc., Alexandria, VA (US)

( * ) Notice: Subject to any disclaimer, the term of this patent is extended or adjusted under 35 U.S.C. 154(b) by 0 days.

(21) Appl. No.: 16/869,578

(22) Filed: May 7, 2020

Related U.S. Application Data

(60) Provisional application No. 62/844,671, filed on May 7, 2019.

(51) Int. Cl.
| | |
|---|---|
| *G06F 8/60* | (2018.01) |
| *G06F 16/17* | (2019.01) |
| *G06F 16/182* | (2019.01) |
| *G06N 5/02* | (2006.01) |
| *H04L 29/08* | (2006.01) |

(52) U.S. Cl.
CPC ............ *G06F 8/60* (2013.01); *G06F 16/1734* (2019.01); *G06F 16/183* (2019.01); *G06N 5/02* (2013.01); *H04L 67/06* (2013.01); *H04L 67/2814* (2013.01)

(58) Field of Classification Search
CPC ....... H04L 67/06; H04L 67/2814; G06F 8/60; G06F 16/1734; G06F 16/183; G06N 5/02
See application file for complete search history.

(56) References Cited

U.S. PATENT DOCUMENTS

| | | | | |
|---|---|---|---|---|
| 7,171,479 | B2 * | 1/2007 | Buchanan | H04L 29/06 709/228 |
| 7,797,633 | B2 * | 9/2010 | Flick | G06F 3/04847 715/726 |
| 8,718,445 | B1 * | 5/2014 | Berger | H04N 5/92 386/249 |
| 9,070,139 | B2 * | 6/2015 | Zhang | G06Q 30/02 |
| 9,491,225 | B2 * | 11/2016 | Liu | H04N 21/2393 |
| 10,264,041 | B2 * | 4/2019 | Bologh | H04N 21/47202 |
| 2002/0178232 | A1 * | 11/2002 | Ferguson | H04L 67/2847 709/217 |

(Continued)

FOREIGN PATENT DOCUMENTS

| | | | | |
|---|---|---|---|---|
| EP | 1826980 A1 | * | 8/2007 | ........ H04L 67/108 |
| JP | 2010098526 A | * | 4/2010 | ........ H04N 21/4334 |

(Continued)

*Primary Examiner* — Kostas J Katsikis

(57) ABSTRACT

The present invention teaches a system and method for estimating the degree of completeness for large file downloads measured through redirects, without access to complete media server logs. According to a first preferred embodiment, the present invention provides accurate download counts by using data from redirect server logs, along with samples of the media server-side logs. According to a further preferred embodiment, the present invention teaches a system and method for sampling networked media servers hosting similar media files to determine approximate download completeness.

5 Claims, 3 Drawing Sheets

(56) References Cited

U.S. PATENT DOCUMENTS

| | | | | |
|---|---|---|---|---|
| 2003/0204603 | A1* | 10/2003 | Buchanan | H04L 67/322 |
| | | | | 709/228 |
| 2008/0168359 | A1* | 7/2008 | Flick | G06F 3/04847 |
| | | | | 715/748 |
| 2008/0168516 | A1* | 7/2008 | Flick | H04N 21/47202 |
| | | | | 725/112 |
| 2011/0060519 | A1* | 3/2011 | Hunter | G08G 1/09685 |
| | | | | 701/532 |
| 2014/0136653 | A1* | 5/2014 | Luby | H04L 65/4015 |
| | | | | 709/217 |
| 2014/0195643 | A1* | 7/2014 | Liu | H04N 21/23109 |
| | | | | 709/217 |
| 2015/0188986 | A1* | 7/2015 | Okubo | H04L 69/14 |
| | | | | 709/219 |
| 2016/0352817 | A1* | 12/2016 | Burba | H04L 67/06 |
| 2017/0099205 | A1* | 4/2017 | Gupta | H04L 43/0817 |
| 2019/0191355 | A1* | 6/2019 | Apostolopoulos | |
| | | | | H04L 67/2847 |
| 2020/0177668 | A1* | 6/2020 | Guerrero | G06F 16/1824 |

FOREIGN PATENT DOCUMENTS

| | | | | |
|---|---|---|---|---|
| JP | 6148638 B2 | * | 6/2017 | |
| WO | WO-2007021387 A2 | * | 2/2007 | H04N 21/26216 |

* cited by examiner

US 11,061,656 B1

SYSTEM AND METHOD FOR PROVIDING ANALYSIS OF DOWNLOAD COMPLETENESS FOR DOWNLOADABLE MEDIA

RELATED APPLICATIONS

The present application claims the benefit of U.S. Provisional Application Nos. 62/844,671 and 62/844,659 both filed May 7, 2019. These applications are each hereby incorporated herein by reference.

BACKGROUND AND FIELD OF THE PRESENT INVENTION

1. Field of the Present Invention

The present invention relates generally to a system and method for measuring download completeness within a networked system. More specifically, the present invention relates to a system and method for analyzing server-side file delivery data.

2. Background of the Invention

Podcasting is a method of distributing digital media, typically audio programs, via the Internet. Most commonly, podcasting distributes media files through a subscription model. This model typically uses an RSS or XML feed ("feed") to identify and deliver media files. The technology behind RSS allows a client to subscribe to RSS feeds to access media files (e.g. .MP3 files) uploaded by content producers. Access to the media files is typically provided through an "aggregator" (e.g. a web site containing links to media files such as iTunes) which allows clients to subscribe to a particular feed and to receive new content as it becomes available. Direct access to selected media servers can also be used to access and download media files.

The commercial podcast industry relies primarily on advertising revenue to generate profits. These advertisements are normally embedded within each podcast download. For this reason, determining the completeness of unique individual downloads is necessary to value the amount of advertising delivered for each sponsor.

Commonly, downloads of online content are tracked and counted using redirect technology, whereby the initial requests from the client software goes to a third-party server, which logs the request and then responds to the client software with the actual location of the requested file. The client software then issues a new request directly to the secondary location to obtain the file itself (or, in some instances, to be met with another redirect).

For large file downloads, accurately counting unique file downloads via a redirect process is complicated due to the prevalence of progressive downloads, whereby the file is downloaded in multiple pieces using distinct requests to the media server, rather than as a single file requested all at once. This problem is further compounded by the fact that there are important differences in the data available to the redirect server and the media file server.

Specifically, the media server log file includes data for each media request including: IP address, user agent, time of request, file requested, byte range, bytes served and file size. In contrast, the redirect server log files do not consistently include information such as bytes served and file size, which are needed to determine the disposition of the requests.

Accordingly, it is often desirable to analyze the raw log file data from media file servers to arrive at a consistent measure of unduplicated download sessions that exceed a threshold for completeness, or to characterize the entire spectrum of download sessions in terms of download completeness. However, these are files are difficult to fully and consistently access. For this reason, media distribution systems have difficulty calculating the number of completed download sessions (e.g. download sessions meeting specific threshold criteria). What is needed is a system and method which allows for the reliable measurement of unique, completed media file downloads.

SUMMARY OF THE PRESENT INVENTION

The present invention overcomes the limitations of the prior art by providing a system and method for estimating the degree of completeness of large file downloads measured through redirects, without access to complete media server logs.

According to a first preferred embodiment, the present invention provides accurate download counts by using data from the redirect logs, along with samples of the media server-side logs. According to a further preferred embodiment, the present invention teaches a system and method for sampling networked media servers hosting similar media files to determine approximate download completeness.

According to further aspects of the present invention, the system of the present invention analyzes client software packages and determines the built-in behavior/characteristics of each software package with respect to the type of file requests it makes (such as monolithic, progressive, or other download behaviors) and whether it bypasses the redirect server on subsequent partial-file requests. Thereafter, the system uses these characteristics to analyze redirect requests from those same or similar client software packages ongoing, such that download counts can be characterized with an accurate estimate of degree of completion, when compared against defined thresholds.

According to an exemplary method, the system of the present invention may determine the number of completed downloads by first querying server-side files (such as redirect log files) for a list of download requests made over a given time period (e.g. a lookback window). This data preferably includes range request data and an identifier indicating the client software making the download request. The system then preferably estimates the proportion of requested data which is actually downloaded based on the stored characteristics of each client software package. The system then preferably uses the estimated proportions to adjust the count of completed downloads (or proportion of data) provided by the media server in response to each media file request.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
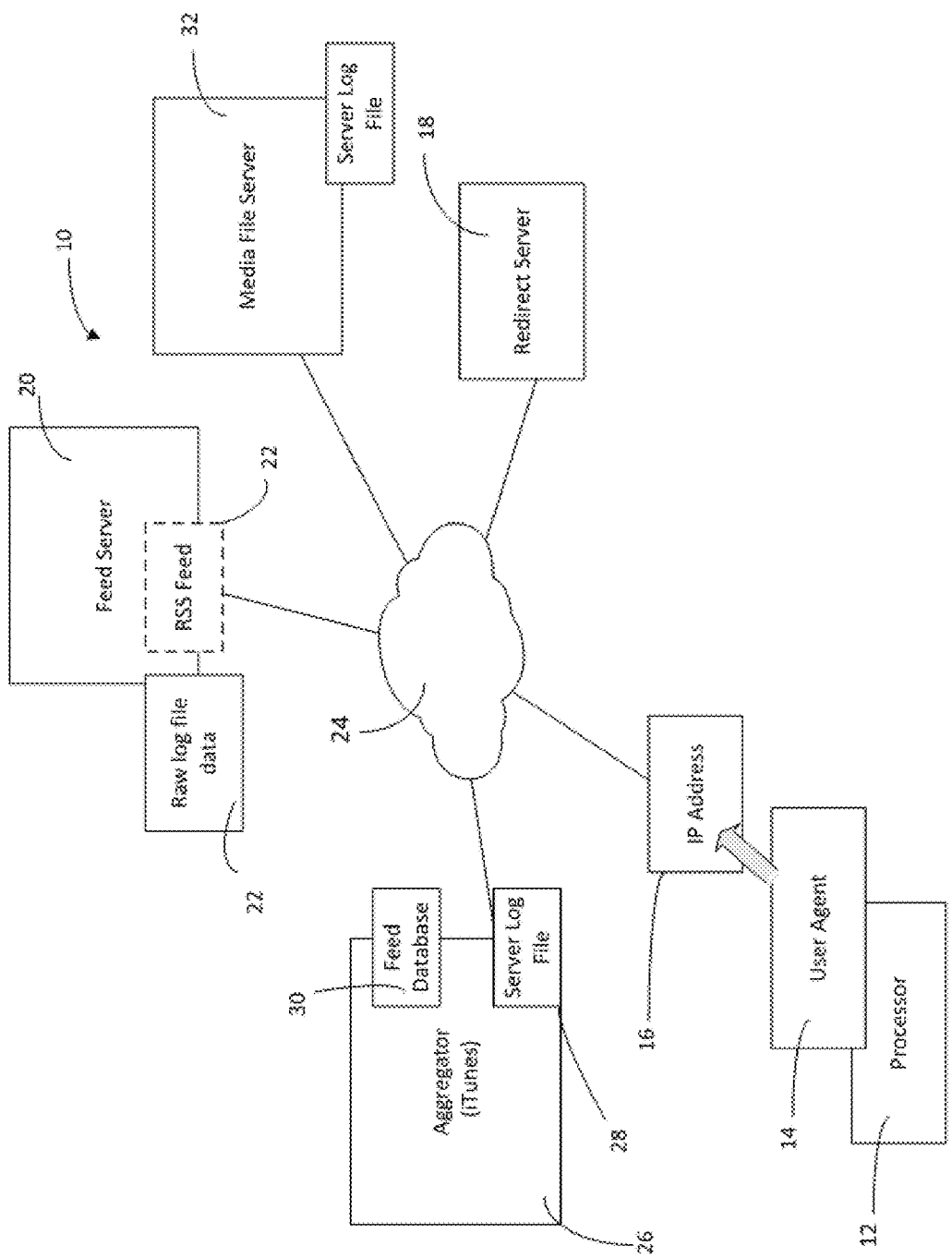
FIG. 1 shows a block diagram illustrating an exemplary network for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer or networked. A program, computer program, or software application may include a subroutine, a function, a procedure, an object implementation, an executable application, an applet, a servlet, a source code, an object code, a shared library, a dynamic load library and/or other sequence of instructions designed for execution on a computer system. The terms "processor," "module," "system," "subsystem," "domain," "engine," and the like as used herein are defined as a computer processor, set of processors, collection of computer elements or computer code for executing instructions within a computer or within a computer system. A "database," "data repository," "data store" and the like, as used herein, include many different types of computer readable media that allow a computer to store, organize and manage data on a data storage means. Such data storage means can include, for example, non-volatile memory, such as ROM, RAM, CD-ROM, DVD, and other permanent storage media. However, even volatile storage such a RAM, buffers, cache memory, and network circuits are contemplated to serve as such data storage means according to different embodiments of the present invention.

Further, the terms "podcast", "content", "media", or "media files" are intended to broadly encompass any type or category of computer-readable files and/or stored media, either singly or collectively. More specifically, these terms include such files or feeds in any format (e.g., .MP3, .MPEG, .WAV, .JPG) and containing any content (e.g., text-based, audible, visual or some combination thereof) that can be downloaded to a client without limitation. Additionally, the present application refers to the "downloading" of files. The term "downloading" in this context refers to any transmission of media including streaming, partial downloads and full downloads of files without limitation.

It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must"). Further, words using the singular or plural number also include the plural or singular number, respectively. Additionally, the words, 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combinations of the items in the list.

With reference now to FIG. 1, a first exemplary system 10 which may be used to implement aspects of the present invention is provided. As shown, the exemplary system 10 includes a user agent 14 (e.g. web browser) running on a computing device or processor 12 (such as a personal computer, smart phone, PDA or the like). The user agent 14 is preferably coupled to the internet 24 from a given IP address 16. The processor 12 and user agent 14 preferably together include the software necessary to subscribe to podcasts provided by an aggregator/subscription service 26. The aggregator service 26 of the present invention may include any number of servers and networks.

The aggregator service 26 preferably includes a feed database 30 which includes a list of podcasts/feeds which may be selected and linked to a given processor 12 and user agent 14. This list may be periodically refreshed and may include information links and other information identifying podcast content on a given feed 22. In addition, the aggregator service 26 may also include links to a range of content servers which the aggregator service 26 may use to store, host and link to media. The aggregator service 26 may also include a search engine which may perform multiple functions including crawling the network 10 to identify, retrieve and store feed data for searching by user agents 14.

The system 10 also may include any number of other re-directing servers 18 and other media servers 32 which may store, buffer and re-direct data traffic to enhance the seamless flow of data to a requesting user agent 14. Additionally, the system may include other 3rd party servers which may perform other services such as ad placement and the like. As shown, the feed server 20 preferably includes one or more feeds 22, such as RSS feeds, that are accessible through the network/Internet 24 as shown. Each feed 22 preferably includes information about a given set of media (i.e. podcasts) so that they can be retrieved by a user agent 14 either directly, or via the aggregator service 26 and/or another server 18, 32.

As shown, each processor 12 is preferably connected to each element of the network 10 via the Internet 24. Alternatively, different components of the present invention may be communicatively coupled differently, for example each may be coupled directly via VPN connections or the like. Additionally, each element of the network and their respective sub-elements/modules may be distributed so that certain functions may operate at various locations throughout the system 10. Thus, the description herein of a function or component being associated with a particular device or component or location is merely one possible embodiment.

Figure 2:
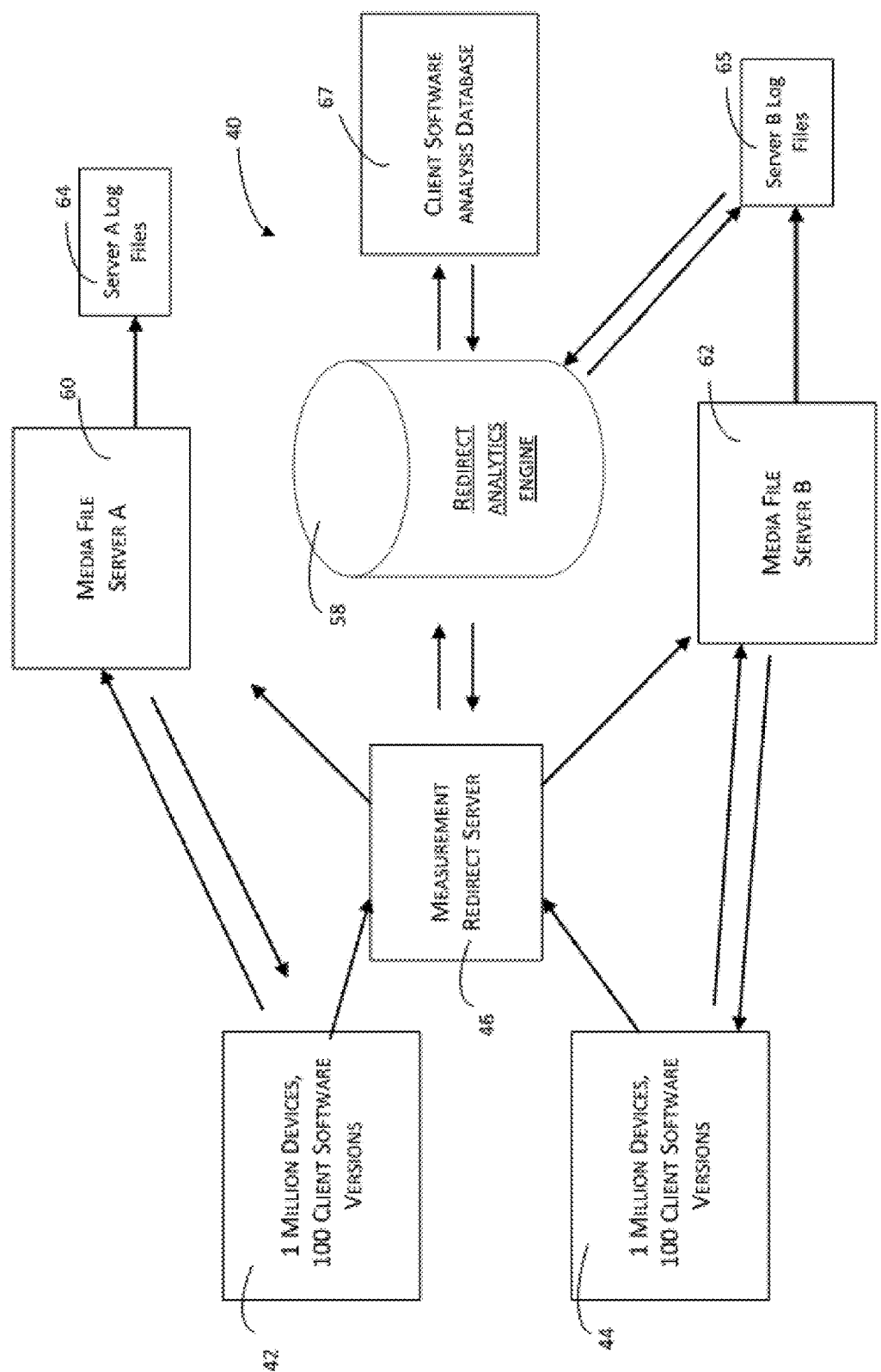
FIG. 2 shows a block diagram illustrating an exemplary communication arrangement for retrieving redirect log file data and sampling media log file data
Figure 3:
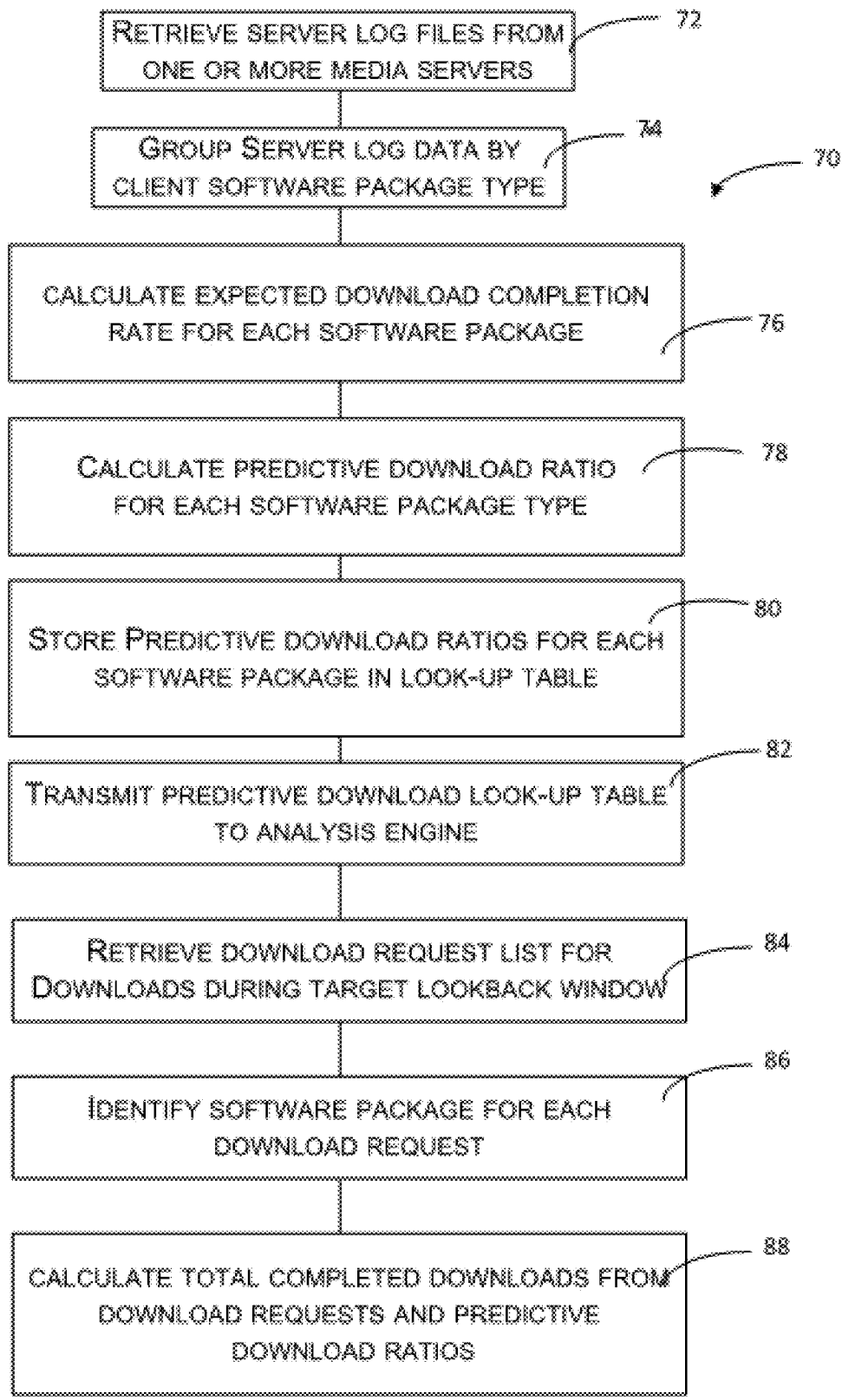
FIG. 3 shows a block diagram illustrating a preferred method in accordance with a first preferred embodiment of the present invention.

With reference now to FIGS. 2-3, an exemplary system 40 and method 70 in accordance with a preferred embodiment of the present invention shall now be discussed. In FIG. 2, multiple sets of client devices 42, 44 are shown communicating with multiple media file servers 60, 62 through a first measurement/redirect server 46. As discussed above, the redirect server 46 may preferably provide links for each set of respective client devices 42, 44 to communicate directly with each respective media file server 60, 62 (or to another redirect server). In this way, the client devices 42, 44 may directly download files from the media file servers 60, 62 within this system.

To provide counts of downloads, the redirect server 46 may preferably "push" or forward redirect file delivery data to a processor/analytics engine 58 for storage and analysis. Alternatively, the redirect file delivery data may be requested or "pulled" by the requesting server. Although shown separate, the processor/analytics engine 58 may be co-located with the first measurement/redirect server 46 and/or its functions may be performed by the first measurement/redirect server 46.

According to a preferred embodiment, the analytics engine 58 may preferably additionally receive data regarding the download behavior of a variety of client software packages. This behavior data may be determined from sampling the server logs of one or more third-party media servers 62. Additionally, the selected statistical data for any detected software package may alternatively be independently requested and received from any of a variety of sources such as a client software analysis database 67 or the like.

According to an alternative preferred embodiment, the analytics engine 58 (separately or as part of the measurement redirect server 46 or other server) may also download selected media files along with the sampled log files. The sampled log files and the selected media files may either be stored together or separately. With respect to the stored media files, the redirect server 46 may then provide direct access to selected media files without providing links to a separate media server. At the same time, the system may continue to allow other users to access the selected media files from the original media server 60, 62.

With reference now to FIG. 3, an exemplary method 70 of the present invention includes a first step 72 of retrieving sample file delivery data from one or more media servers. According to alternative embodiments, the data sampled does not need to be stored in the media server. Alternatively, the data may be stored and retrieved from any server or storage device without limitation. For example, log data from the media server may be stored in a third-party database or the like. In the example shown in FIG. 2, the Analytics Engine 58 is shown sampling data from the server log file 65 of a single media file server 62.

At a next step 74, the system may group the logged data based on the requesting client software package type and version. Such grouping may include any method of grouping such as extracting listed downloads by the client software types, coding downloads by client software package type or the like. At a next step 76, the system may then calculate the download completion rates for each media file request. According to a preferred embodiment, the download completion rates are preferably determined by a comparison of the byte ranges requested to the bytes served for each download request. Alternatively, the download completion rates for each software package may be determined by adding together the total bytes request by the total bytes served for each software package type.

At a next step 78, the system may preferably calculate a predictive download completion rate for each software type and version by averaging the download completion rates for each group of software types and version. At a next step 80, the system may store and associate each predictive download ratio with each respective software type and/or version. Preferably, the system may store and associate each pair of data within a lookup table or the like. Alternatively, each pair of associated data may be individually listed and coded for later lookup and retrieval. According to a next step 82, the system may transmit the look-up table (or coded list) of calculated download completion rates to a server for storage and later access. In the example shown in FIG. 2, the exemplary storage server may be a storage module 67 linked to the Analytics Engine 58. Alternatively, the look-up table may be stored and/or access from any device or location within the system.

According to a next step 84, the system may preferably retrieve logged media file requests. As discussed above, this retrieved data preferably includes each media file request along with each requesting software package and version. In the example of FIG. 2, the Analytics Engine 58 is shown retrieving logged media file requests from the Measurement/Redirect Server 46. At a next step 86, the system may then identify each software package used for each download request.

At a next step 88, the system may then preferably calculate the number of completed downloads by multiplying the total number of download requests (by software package type and version) by each the predictive download ratio for each identified client software package type and version. The resulting product preferably represents the properly weighted number of download requests by each software package type and version. The system may then determine the total number of successful downloads of a given media file by combining together the weighted number of downloads calculated for each software package type. Additionally, the present invention may thereafter apply minimal download thresholds to each download request to exclude requests which do not represent actual media file downloads or partial downloads.

According to further preferred embodiments, the present invention may further weight each download request based on a combination of the identified client software package type and additional media file request data. In particular, the system of the present invention may weight download requests from the same identified client software package differently based on the number of bytes requested or other data such as the time of the request, the IP Address, HTTP Status Code, Referrer or the like. More specifically, the present invention may apply different weights to requests from the same client software package where the software package behavior is determined to be different based on other sampled data. For example, an identified client software package A may be determined to have a 0% download rate when requesting 0-20 bytes of data, and to have a 50% download rate when requesting more than 20 bytes of data. Based on this sampled data, the system of the present invention may apply these weights to each file request made from software package A to calculate download completion rates without needing to access the media file server or any other server as discussed above.

While the above descriptions regarding the present invention contain much specificity, these should not be construed as limitations on the scope, but rather as examples. Further, while particular embodiments of the invention have been described, it will be understood that the invention disclosed is not limited thereto, since modifications may be made by those skilled in the art, particularly in light of the foregoing teachings. It is, therefore, contemplated by the appended claims to cover any such modifications that incorporate those features or these improvements which embody the spirit and scope of the present invention.

What is claimed is:

1. A method of estimating the number completed media file requests submitted by a plurality of client software packages within a media delivery system; wherein the client software packages request stored media files from at least a first media server having a first server log file, and a second media server having a second media server log file; the method comprising:

retrieving a plurality of sample log files from the first media server; wherein the plurality of sample log files comprise a plurality of sample media file requests; wherein each sample media file request comprises request data selected from the group of request data comprising: time stamp data, bytes served data, user agent data and byte range data; wherein the user agent data comprises the type of client software package requesting the media file;

creating software package groups; wherein the software package groups are created by grouping together sample media file requests based on the type of client software package identified in each sample media file request;

calculating the download completion rates for sample media file requests made by each software package group; wherein the download completion rates are calculated by comparing the byte range of each request with the bytes served of each request for each download request;

calculating a predictive download completion rate for each software type and version by averaging the download completion rates for each group of sample media file requests in the software package group;

storing and associating each predictive download ratio for each software package group; wherein the data is associated within a lookup table;

transmitting the look-up table of expected download completion rates to a server for storage and later access;

retrieving a redirect server log file; wherein the redirect server log file comprises a second set of log data; wherein the second set of log data comprises a plurality of partial media file requests; wherein each partial media file request comprises user agent data and bytes requested data for each partial media file request; wherein the redirect server is separate from the first media server and the second media server;

identifying the software package and bytes requested for each partial media file request based at least in part on the second set of log data;

calculating a download completion estimate for each partial media file request; wherein the download completion request is determined at least in part using the predictive download ratio for the user agent data stored in the look-up table; and determining whether each download request meets a minimum download threshold.

2. The method of claim 1, wherein the software package groups comprise software package groups for a plurality of software types and software versions.

3. The method of claim 2, wherein the step of creating software package groups comprises coding sample media file requests by client software package type and version.

4. The method of claim 3, wherein the step of calculating the download completion rates comprises dividing the total retrieved byte ranges for the plurality of sample media file requests by the total of bytes requested for the plurality of sample media file requests.

5. The method of claim 4, wherein a predictive download ratio is associated with one or more software package groups by a code applied to one or more software package groups.

* * * * *